Jan. 18, 1949.    J. N. WOLFRAM    2,459,609
COUPLING FOR TUBES
Filed Feb. 15, 1945
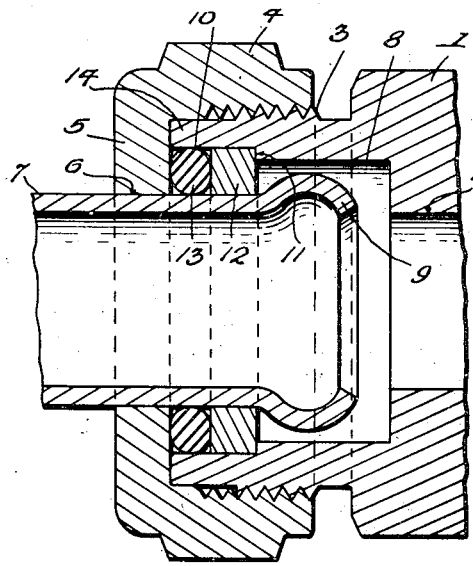
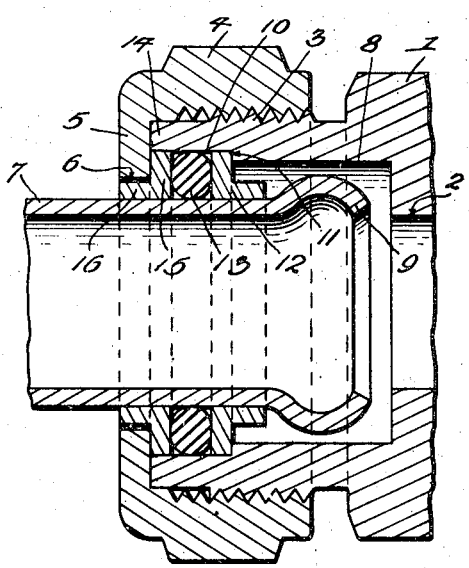
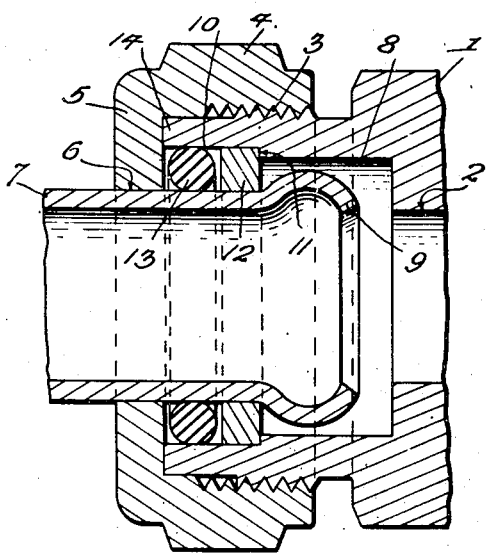
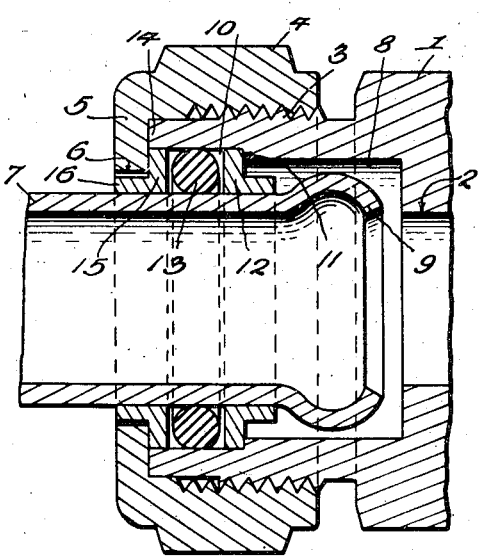
INVENTOR.
John N. Wolfram.
BY
Mason, Porter & Willes
Attys.

Patented Jan. 18, 1949

2,459,609

UNITED STATES PATENT OFFICE 2,459,609

COUPLING FOR TUBES

John N. Wolfram, Cleveland, Ohio, assignor to The Parker Appliance Company, Cleveland, Ohio, a corporation of Ohio Application February 15, 1945, Serial No. 578,076

2 Claims. (Cl. 285—122)

1

The invention relates to new and useful improvements in a coupling for tubes, and more particularly a tube having the end thereof beaded or otherwise enlarged.

An object of the invention is to provide a coupling for a tube wherein the tube is retained in the coupling and sealed thereto by a metal ring and a deformable gasket disposed in a recess formed by a counter-bore in the body member, which counter-bore is closed by the nut or parts associated therewith when the flange of the nut is brought into contact with the end of the body member.

A further object of the invention is to provide a coupling of the above type wherein the recess for the metal ring and deformable gasket is dimensioned so that the nut will contact with the gasket and deform the same into tight sealing contact with the tube and the body member before the flange of the nut makes contact with the end of the body member.

In the drawings—

Figure 1 is a longitudinal sectional view through a coupling embodying the improvements, the coupling being closed and having a tube secured thereto;

Figure 2 is a view similar to Figure 1 but showing a slightly modified form of construction wherein an outer ring is positioned between the flange of the nut and the sealing gasket;

Figure 3 is a view similar to Figure 1 showing a further modified form of the invention wherein the recess for the sealing gasket is so dimensioned that the gasket is free from pressure in a direction longitudinal of the tube.

Figure 4 is a view similar to Figure 3 showing a further modified form of the invention wherein an outer ring is provided for closing the recess for the sealing gasket and wherein said recess is so dimensioned that the gasket is free from pressure longitudinal of the tube.

As shown in Figure 1 of the drawing, the coupling includes a body member 1 and the usual bore 2 therethrough. Said body member is provided with a threaded portion 3 adapted to receive a nut 4. The nut 4 is provided with a flange 5 at its outer end and the flange 5 has an opening 6 therethrough. The tube 7 to be secured to the coupling extends through this opening into a recess in the body member formed by a counter-bore 8. The inner end of said tube is enlarged as indicated at 9. This may be formed by beading as shown in the drawings, or by flaring, or in any other way. This enlarged end of the tube is disposed in the recess formed by the counter-

2 bore 8 and the enlarged end is out of contact with the body member so that no particular accuracy is necessary in the forming of the enlarged end on the tube. The purpose of this enlarged end will be referred to later.

The body member 1 is provided with a second counter-bore 10 which is larger than the counter-bore 8 and provides a shoulder 11 at the inner end thereof. Disposed in this second counter-bore is a metal ring 12 which is preferably rectangular in radial cross section. This metal ring is dimensioned so as to slip freely into the second counter-bore 10 and contact with the shoulder 11. Said metal ring 12 also has a free sliding connection with the tube 7. The second counter-bore 10 is dimensioned so as to provide a recess for a sealing gasket 13. This sealing gasket 13 is preferably initially circular in radial cross section and is formed of any suitable deformable material, but preferably rubber.

As shown in Figure 1, the sealing gasket 3 is so dimensioned as to project slightly beyond the end of the body member before the nut is threaded onto the body member. When the nut is threaded onto the body member so that the flange 5 contacts with the end 14 of the body member, the recess for the deformable gasket 13 is completely closed and the gasket is put under pressure between the flange and the ring 12, which will expand the gasket radially inwardly and outwardly into tight sealing contact with the tube and the inner wall of the counter-bore 10.

The nut, deformable gasket and metal ring are slipped onto the tube before the end of the tube is beaded or flared, after which the end of the tube is placed in the body member and the nut threaded onto the same. It will be noted that the nut, when the coupling is closed, contacts with the end of the body member and thus assures a strong leak-proof joint without overstressing the sealing ring. When the nut contacts with the end of the body member, the tightness of the joint is not left to the discretion of the workman, and all workmen, whether experienced or inexperienced, can pull up this coupling and get the same results.

The gasket recess is closed except for minute clearances between the tube and the metal ring 12 and between said ring and the inner wall of the counter-bore 10. This prevents extrusion of the sealing gasket by fluid pressure on the line or pull-out strains on the tube. Any pull-out strain on the tube will bring the enlarged head of the tube into contact with the metal ring 12 and any outward movement of the metal ring will press the gasket against the flange of the nut and thus the tube is restrained against any pulling out of the coupling. When the rink gasket contacts with the flange of the nut the tube does not rotate when the nut is turned for the reason that the contact area of the ring gasket with the counter-bore and the metal ring is larger than the contact area with the radial wall of the nut. In the assembled position of the coupling there is no clamping or other stress induced in the tube other than the slight pressure of the ring gasket thereagainst.

The construction of the coupling shown in Figure 2 is similar to that shown in Figure 1 and like reference numerals have been applied thereto. The added feature of the coupling as shown in Figure 2 is the metal ring 15 which is moved by the flange of the nut into the recess formed by the bore 10 in the body member. Said metal ring 15 is dimensioned so as to close the recess and is also provided with an outward extension 16. The flange of the nut has an enlarged opening to receive this extension 16. The nut bears against the ring 15 and will turn thereon with no tendency whatever to turn the tube, and when the coupling is completely closed, the ring gasket 13 will be deformed by the pressure exerted thereon by the metal rings 12 and 15 so as to make tight sealing engagement with the tube and also tight sealing engagement with the inner wall of the bore 10. The flange 5 contacts with the end of the body member 1 and this will limit the turning of the nut onto the body member. The ring 12 is shaped slightly different in Figure 2 than in Figure 1, but in all essential particulars it is the same. This coupling as shown in Figure 2 functions precisely in the same way as the coupling shown in Figure 1 and described in detail above.

The coupling shown in Figure 3 is likewise similar in construction to the coupling shown in Figure 1, and like reference numerals have been applied thereto. The only distinction between the coupling shown in Figure 1 and that shown in Figure 3 resides in the length of the counter-bore 10 in the body member 1. This counterbore is of greater depth, as shown in Figure 3 so that the ring gasket 13, when the coupling is closed, is not subjected to pressure between the flange of the nut and the metal ring 12. The ring gasket is dimensioned so that when it is placed on the tube and inserted in the bore of the body member 1 it will be distorted sufficiently so as to expand into tight sealing contact with the tube and the inner wall of the counterbore 10. Any pull-out strain on the tube will cause the ring 12 to contact with the gasket 13 and the gasket 13 to contact with the flange of the nut and thus the tube is restrained from being separated from the coupling. This coupling as shown in Figure 3, functions in very much the same way as the coupling shown in Figure 1 and further description thereof is thought unnecessary. Attention is called to the fact that the flange 5 of the nut 4 in Figure 3 contacts with the end of the body member 1 and this limits the turning movement of the nut.

In Figure 4 of the drawing the coupling is very similar to that shown in Figure 3 except that there is also employed a second ring 15 similar to the ring 15 shown in Figure 2. This ring 15 has an extension 16 extending into the opening in the flange 5 of the nut 4. The ring 15 closes up the recess formed by the counter-bore 10 and this recess is so dimensioned that neither the metal ring 15 nor the metal ring 12 contact with the deformable ring gasket 13. The coupling shown in Figure 4 operates in precisely the same manner as the coupling shown in Figure 3 and further description thereof is not thought necessary.

It is obvious that minor changes in the details of construction may be made without departing from the spirit of the invention as set forth in the appended claims.

I claim:

1. A coupling for tubes comprising a body member having a bore therethrough and a counterbore forming a recess to receive the enlarged head on a tube, said body member having a threaded portion on the outer surface thereof, a nut telescoping said body member and having a thread on the interior thereof adapted to cooperate with the thread on the body member, said nut having a flange at its outer end extending inwardly of the threaded portion and having an opening therethrough for the tube, said body member having a second counterbore providing a shoulder at its inner end, a metal ring disposed in the second counterbore and contacting with said shoulder, said ring being dimensioned so as to engage the tube in rear of the enlargement therein for securing the tube to the coupling, and a deformable sealing gasket in said second counterbore between the ring and the flange on the nut, said second counterbore being dimensioned so that the flange on the nut engages the end of the body member when the coupling is closed.

2. A coupling for tubes comprising a body member having a bore therethrough and a counterbore forming a recess to receive the enlarged head on a tube, said body member having a threaded portion on the outer surface thereof, a nut telescoping said body member and having a thread on the interior thereof adapted to cooperate with the thread on the body member, said nut having a flange at its outer end extending inwardly of the threaded portion and having an opening therethrough for the tube, said body member having a second counterbore providing a shoulder at its inner end, a metal ring disposed in the second counterbore and contacting with said shoulder, said ring being dimensioned so as to engage the tube in rear of the enlargement therein for securing the tube to the coupling, and a deformable sealing gasket in said second counterbore between the ring and the flange on the nut, said second counterbore being dimensioned so that the flange on the nut engages the end of the body member when the coupling is closed, the longitudinal dimension of the gasket being smaller than the distance between the ring and the flange whereby said gasket is free of longitudinal compression between the flange and said ring when the coupling is closed.

JOHN N. WOLFRAM.

REFERENCES CITED

The following references are of record in the file of this patent:

UNITED STATES PATENTS

| Number | Name | Date |
|---|---|---|
| 375,253 | Bersch | Dec. 20, 1887 |
| 1,626,135 | Frankhauser | Apr. 26, 1937 |
| 2,190,419 | Evarts | Feb. 13, 1940 |
| 2,300,584 | Martin | Nov. 3, 1942 |